(12) United States Patent
Baldwin

(10) Patent No.: US 12,224,566 B1
(45) Date of Patent: *Feb. 11, 2025

(54) SWING LID HORIZONTAL SURFACE COVER

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,541

(22) Filed: Nov. 28, 2023

Related U.S. Application Data

(63) Continuation of application No. 18/112,010, filed on Feb. 21, 2023, now Pat. No. 11,876,361, which is a continuation of application No. 17/174,139, filed on Feb. 11, 2021, now Pat. No. 11,588,310.

(60) Provisional application No. 62/975,182, filed on Feb. 11, 2020.

(51) Int. Cl.
H01B 7/40 (2006.01)
H01B 7/08 (2006.01)
H01B 13/012 (2006.01)
H02G 3/08 (2006.01)
H02G 3/14 (2006.01)

(52) U.S. Cl.
CPC ............... *H02G 3/081* (2013.01); *H02G 3/14* (2013.01)

(58) Field of Classification Search
CPC .......... H02G 3/081; H02G 3/14; H02G 3/185; H02G 3/18; H01R 13/447; H01R 13/4532; H01R 13/453; H01R 13/44
See application file for complete search history.

(56) References Cited

U.S. PATENT DOCUMENTS

| 2,559,151 | A |   | 7/1951  | Getzoff |
| 3,598,897 | A |   | 8/1971  | Castic |
| 3,956,573 | A | * | 5/1976  | Myers .................... H02G 3/185 174/67 |
| 4,302,624 | A |   | 11/1981 | Newman |
| 4,660,912 | A |   | 4/1987  | Tomek |
| 4,760,215 | A |   | 7/1988  | Cook |
| 5,064,969 | A |   | 11/1991 | Bloom |
| 5,675,126 | A |   | 10/1997 | Halvorsen |
| 6,179,634 | B1 | * | 1/2001  | Hull ....................... H02G 3/185 439/142 |

(Continued)

Primary Examiner — Hoa C Nguyen
Assistant Examiner — Amol H Patel
(74) Attorney, Agent, or Firm — Jeffrey D. Merrill; Kenneth C. Booth; Booth Udall Fuller, PLC

(57) ABSTRACT

A horizontal surface cover with a cover plate, at least one opening, and at least one access door. The cover plate is configured to cover an electrical device within an electrical box. The at least one opening extends through the cover plate and is sized to allow access to the electrical device through the at least one opening. The at least one access door is sized and shaped to fit within the at least one opening, and has a hinge with a hinge axis. The at least one access door is configured to translate along the hinge axis and rotate about the hinge axis to move between a closed position and an open position. The at least one access door is aligned with and inside of the at least one opening when in the closed position, and is misaligned with the at least one opening when in the open position.

20 Claims, 5 Drawing Sheets

(56) References Cited

U.S. PATENT DOCUMENTS

| | | |
|---|---|---|
| D460,421 S | 7/2002 | Marozsan, Jr. |
| 6,545,218 B1 | 4/2003 | Blaess |
| 6,790,084 B1 | 9/2004 | Osborn, Jr. |
| 7,449,634 B1 | 11/2008 | Shotey |
| 8,410,363 B1 | 4/2013 | Baldwin |
| 10,014,616 B2 | 7/2018 | Schutte |

* cited by examiner

SWING LID HORIZONTAL SURFACE COVER

CROSS REFERENCE TO RELATED APPLICATIONS

This application is a continuation of U.S. Utility patent application Ser. No. 18/112,010 entitled "Swing Lid Horizontal Surface Cover" to Baldwin that was filed on Feb. 21, 2023, which application claims the benefit of U.S. Utility patent application Ser. No. 17/174,139 entitled "Swing Lid Horizontal Surface Cover" to Baldwin that was filed on Feb. 11, 2021, which application claims the benefit of the filing date of U.S. Provisional Patent Application 62/975,182 entitled "Swing Lid Horizontal Surface Cover" to Baldwin that was filed on Feb. 11, 2020, the disclosures of which are hereby incorporated herein by this reference.

TECHNICAL FIELD

Aspects of this document relate generally to covers for horizontal outlets, and more specifically to covers for horizontal outlets with swing lids.

BACKGROUND

In many buildings, electrical outlets are built into the floor or other horizontal surfaces. While this allows electrical outlets to be placed in much more convenient locations, it also presents some problems. With an electrical outlet facing upward, it is very easy for water and other contaminants to fall into the holes for the electrical plugs, creating a shock hazard and making the electrical device inoperable. Electrical outlet covers with doors are conventionally used to prevent these contaminants from entering the horizontal electrical outlet. However, this solution does not sufficiently remedy the problem. For example, when the electrical outlet is not in use, the door may lie flat and flush with the floor, covering the electrical outlet. However, to use the electrical outlet, the door is pivoted up out of the floor and stands vertically. This creates a tripping hazard, and the door easily breaks off. In such cases, the electrical outlet is no longer protected. Some users will even disassemble the door from the outlet cover to remove the unsightly and potentially hazardous open doors. What is needed is a horizontal outlet cover that effectively protects the electrical outlet while allowing access to the electrical outlet in a way that is aesthetically pleasing and does not create additional potential tripping hazards.

SUMMARY

Aspects of this document relate to a horizontal surface cover for a horizontal electrical outlet, comprising a cover plate configured to attach to an electrical box and cover an electrical device within the electrical box, the cover plate having at least one screw hole extending therethrough, at least one opening extending through the cover plate and sized to allow access to the electrical device through the at least one opening, and at least one access door sized and shaped to fit within the at least one opening, the at least one access door comprising a first access door and a second access door, the first access door having a first hinge with a first hinge axis perpendicular to the cover plate and the second access door having a second hinge with a second hinge axis perpendicular to the cover plate, wherein the first access door is configured to translate along the first hinge axis between a closed position and an intermediate position and rotate about the first hinge axis between the intermediate position and an open position, wherein the first hinge rotates from the intermediate position to the open position in a first direction, wherein the second access door is configured to translate along the second hinge axis between a closed position and an intermediate position and rotate about the second hinge axis between the intermediate position and an open position, wherein the second hinge rotates from the intermediate position to the open position in a second direction opposite the first direction, and wherein when the at least one access door is in the closed position, the at least one access door is aligned with and inside of the at least one opening, when the at least one access door is in the intermediate position, the at least one access door is aligned with but outside of the at least one opening, and when the at least one access door is in the open position, the at least one access door is misaligned with the at least one opening.

Particular embodiments may comprise one or more of the following features. The cover plate may further have a top surface, wherein when the at least one access door is in the closed position, the at least one access door is flush with the top surface. The horizontal surface cover may further comprise at least one latch configured to lock the at least one access door in the closed position. One of the at least one access door and the latch may have a lip and the other of the at least one access door and the latch may have an indentation, the lip and the indentation may be configured to mate, and the at least one access door may be configured to unlock when the lip is removed from the indentation.

Aspects of this document relate to a horizontal surface cover, comprising a cover plate configured to cover an electrical device within an electrical box, at least one opening extending through the cover plate and sized to allow access to the electrical device through the at least one opening, and at least one access door sized and shaped to fit within the at least one opening, the at least one access door comprising a first access door and a second access door, the first access door having a first hinge with a first hinge axis and the second access door having a second hinge with a second hinge axis, wherein the first access door is configured to translate along the first hinge axis and rotate about the first hinge axis to move between a closed position and an open position, wherein the second access door is configured to translate along the second hinge axis and rotate about the second hinge axis to move between a closed position and an open position, and wherein when the at least one access door is in the closed position, the at least one access door is aligned with and inside of the at least one opening, and when the at least one access door is in the open position, the at least one access door is misaligned with the at least one opening.

Particular embodiments may comprise one or more of the following features. The first hinge axis and the second hinge axis may each be perpendicular to the cover plate. The first hinge may rotate from the intermediate position to the open position in a first direction, and the second hinge may rotate from the intermediate position to the open position in a second direction opposite the first direction. The first access door may be configured to translate along the first hinge axis between the closed position and an intermediate position and rotate about the first hinge axis between the intermediate position and the open position, wherein, when the first access door is in the intermediate position, the first access door is aligned with but outside of the at least one opening. The second access door may be configured to translate along the second hinge axis between the closed position and an intermediate position and rotate about the second hinge axis between the intermediate position and the open position, wherein, when the second access door is in the intermediate position, the second access door is aligned with but outside of the at least one opening. The cover plate may further have a top surface, wherein when the at least one access door is in the closed position, the at least one access door is flush with the top surface. The horizontal surface cover may further comprise at least one latch configured to lock the at least one access door in the closed position. One of the at least one access door and the latch may have a lip and the other of the at least one access door and the latch may have an indentation, the lip and the indentation may be configured to mate, and the at least one access door may be configured to unlock when the lip is removed from the indentation.

Aspects of this document relate to a horizontal surface cover, comprising a cover plate configured to cover an electrical device within an electrical box, at least one opening extending through the cover plate and sized to allow access to the electrical device through the at least one opening, and at least one access door sized and shaped to fit within the at least one opening, the at least one access door having a hinge with a hinge axis, wherein the at least one access door is configured to translate along the hinge axis and rotate about the hinge axis to move between a closed position and an open position, and wherein when the at least one access door is in the closed position, the at least one access door is aligned with and inside of the at least one opening, and when the at least one access door is in the open position, the at least one access door is misaligned with the at least one opening.

Particular embodiments may comprise one or more of the following features. The at least one access door may be configured to translate along the hinge axis between the closed position and an intermediate position and rotate about the hinge axis between the intermediate position and the open position, wherein, when the at least one access door is in the intermediate position, the at least one access door is aligned with but outside of the at least one opening. The hinge axis may be perpendicular to the cover plate. The horizontal surface cover may further comprise the electrical box configured to surround the electrical device and couple with the cover plate and the electrical device configured to electrically couple with and provide power to an electrical plug. The cover plate may have at least one screw hole extending therethrough. The horizontal surface cover may further comprise at least one latch configured to lock the at least one access door in the closed position. One of the at least one access door and the latch may have a lip and the other of the at least one access door and the latch may have an indentation, the lip and the indentation may be configured to mate, and the at least one access door may be configured to unlock when the lip is removed from the indentation. The cover plate may further have a top surface, wherein when the at least one access door is in the closed position, the at least one access door is flush with the top surface.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
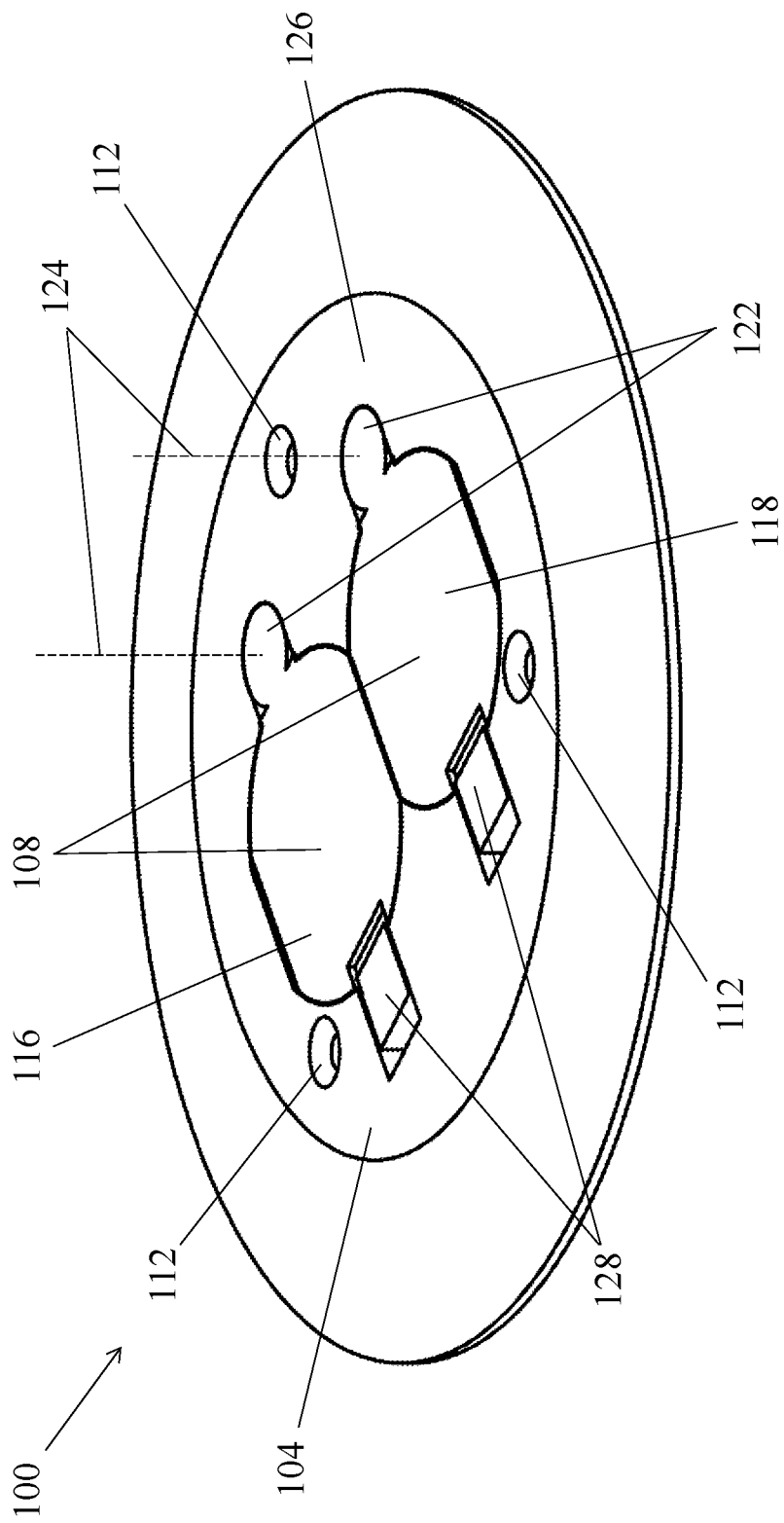
FIG. 1 is a perspective view of a horizontal surface cover for a horizontal electrical outlet with the access doors in a closed position.
Figure 2:
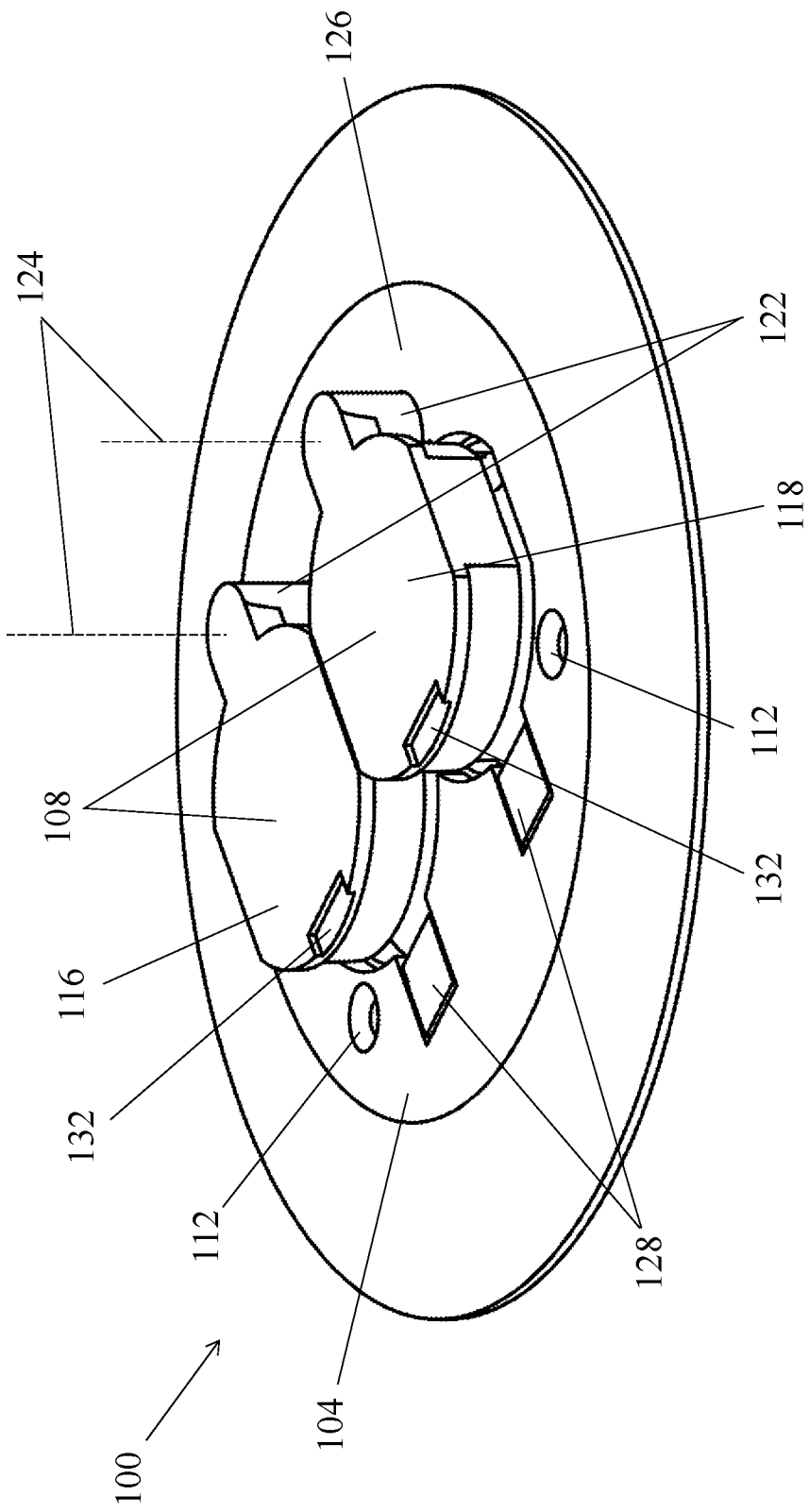
FIG. 2 is a perspective view of the surface cover shown in FIG. 1, with the access doors in an intermediate position.
Figure 3:
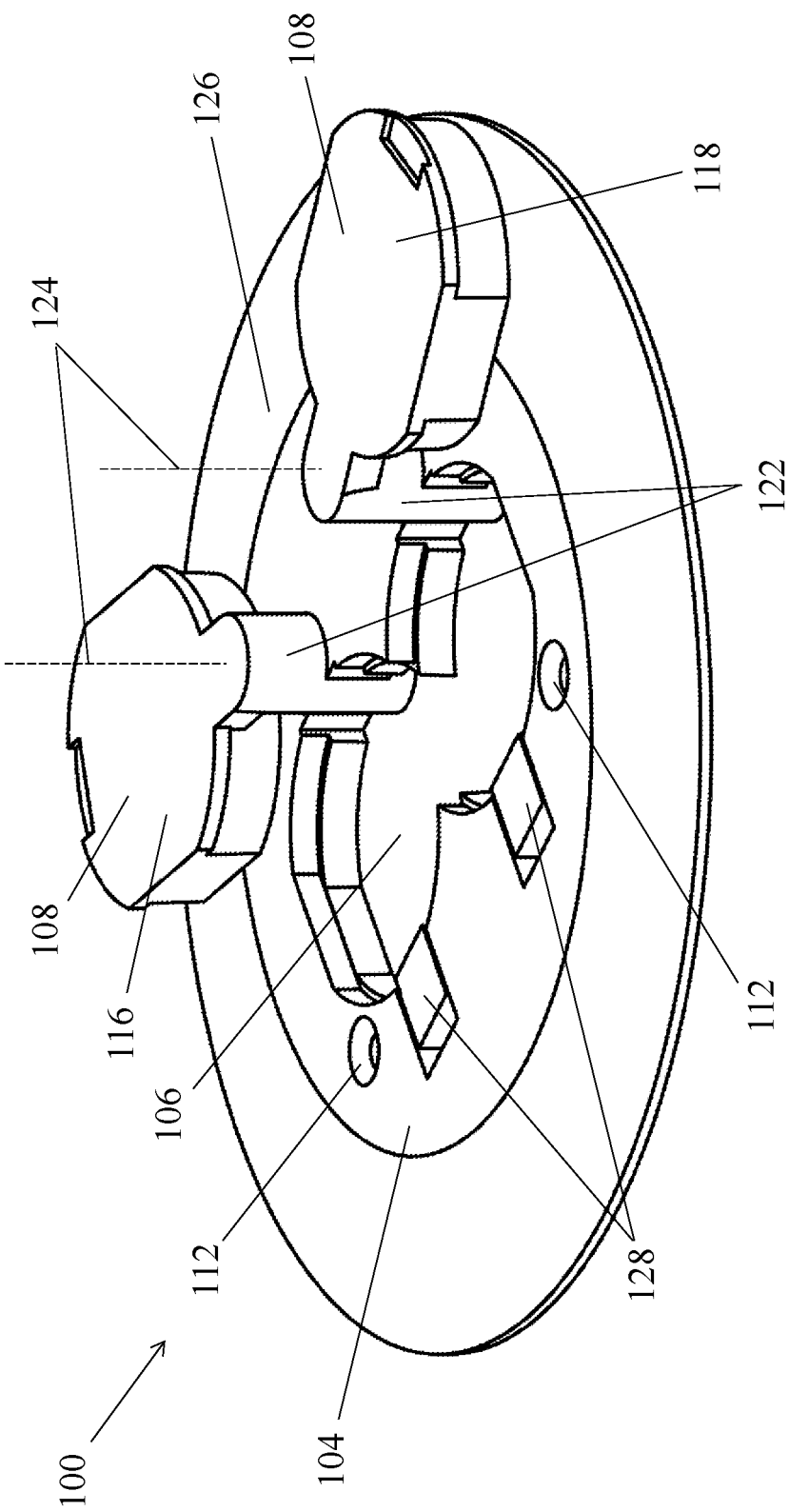
FIG. 3 is a perspective view of the surface cover shown in FIG. 2, with the access doors in an open position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a horizontal surface cover 100 for an electrical device 102 such as an electrical outlet. In some embodiments, the electrical device 102 is located on a horizontal surface, such as a floor. FIGS. 1-6 illustrate one embodiment of the horizontal surface cover 100. The surface cover 100 comprises a cover plate 104, at least one opening 106, and at least one access door 108. The cover plate 104 is configured to attach to an electrical box 110 and cover the electrical device 102 within the electrical box 110, thus providing protection to the electrical device 102. The cover plate 104 may have at least one screw hole 112 extending therethrough. The at least one screw hole 112 allows a screw 114 to couple the cover plate 104 to the electrical box 110 or the electrical device 102 (see FIG. 6). The at least one opening 106 extends through the cover plate 104 and is sized to allow access to the electrical device 102 through the at least one opening 106. Thus, devices such as electrical cords can be coupled with the electrical device 102 through the at least one opening 106.

The at least one access door 108 is sized and shaped to fit with the at least one opening 106. In some embodiments, the at least one access door 108 comprises a first access door 116 and a second access door 118. In embodiments with at least two access doors 108, the at least one opening 106 can be uncovered to allow access to the electrical device 102 without uncovering the entire at least one opening 106. For example, in embodiments with at least two access doors 108 covering an electrical device 102 with two receptacles 120, the first access door 116 may be opened while leaving the second access door 118 closed. An electrical cord may be inserted through the at least one opening 106 and coupled with one of the two electrical receptacles 120 without requiring that the second access door 118 be opened.

Figure 4:
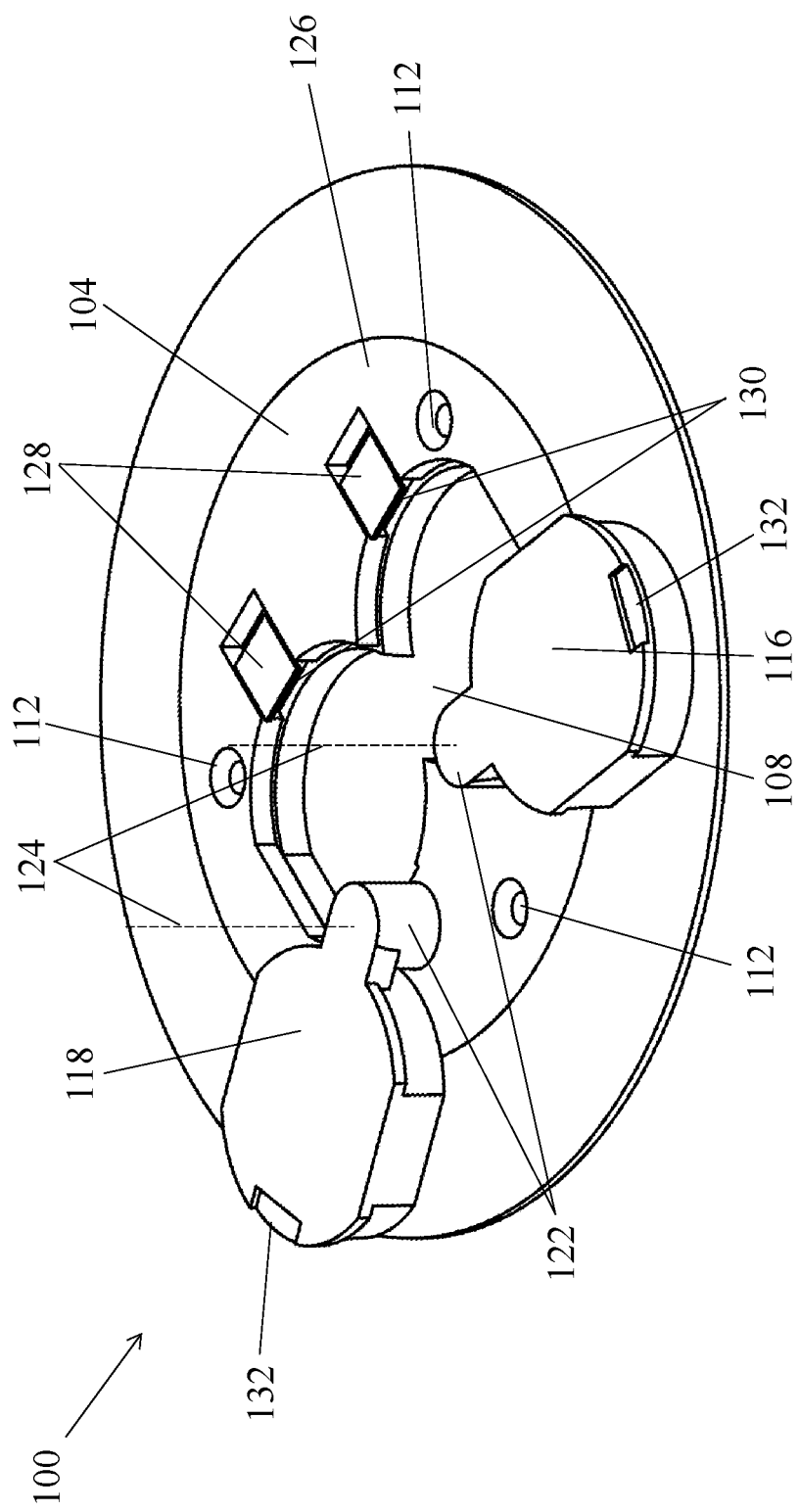
FIG. 4 is another perspective view of the surface cover shown in FIG. 1, with the access doors in the open position.
Figure 5:
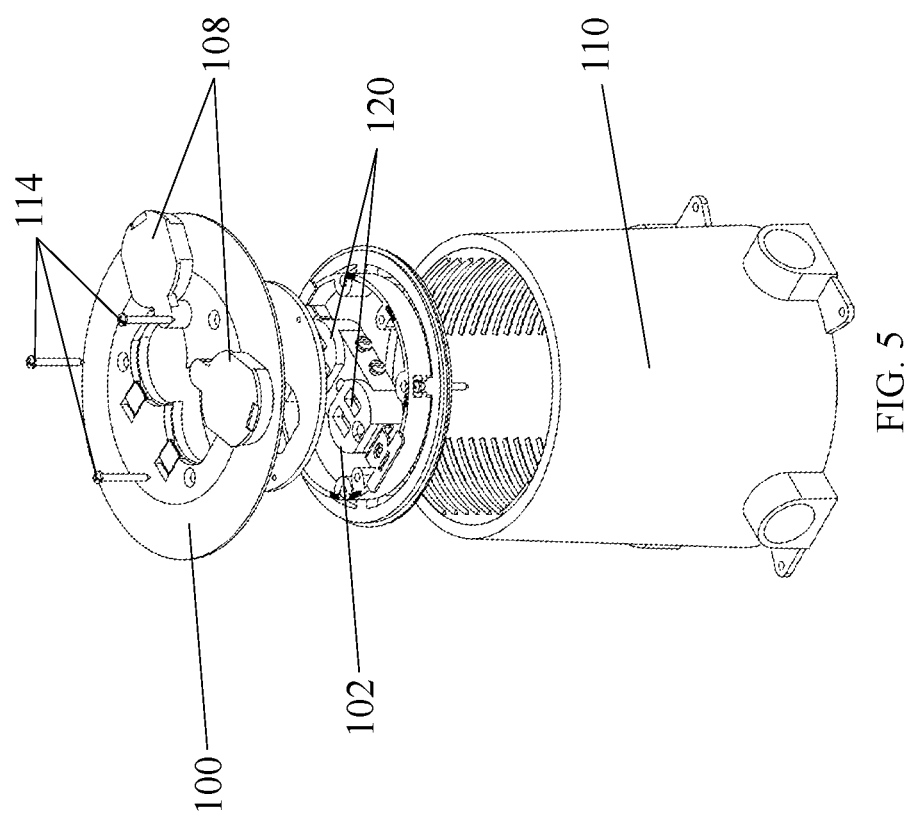
FIG. 5 is an exploded view of the surface cover shown in FIG. 1 installed on an electrical box.

Each access door 108 of the at least one access door 108, including the first access door 116 and the second access door 118, has a hinge 122 with a hinge axis 124. Each hinge axis 124 may be perpendicular to the cover plate 104. In addition, each hinge 122 may be configured to translate along the hinge axis 124 between a closed position (FIG. 1) and an intermediate position (FIG. 3), and to rotate about the hinge axis 124 between the intermediate position (FIG. 3) and an open position (FIGS. 4-5). In some embodiments, the hinge 122 rotates from the intermediate position (FIG. 3) to the open position (FIGS. 4-5) in a first direction. The first direction may be clockwise. In some embodiments with at least two access doors 108, the hinge 122 of the first access door 116 rotates from the intermediate position (FIG. 3) to the open position (FIGS. 4-5) in the first direction, while the hinge 122 of the second access door 118 rotates from the intermediate position (FIG. 3) to the open position (FIGS. 4-5) in a second direction opposite the first direction. In other embodiments with at least two access doors 108, the first access door 116 and the second access door 118 rotate from the intermediate position (FIG. 3) to the open position (FIGS. 4-5) in the same direction.

When the at least one access door 108 is in the closed position (FIG. 1), the at least one access door 108 is aligned with and inside of the at least one opening 106. In some embodiments, the cover plate 104 has a top surface 126, and when the at least one access door 108 is in the closed position (FIG. 1), the at least on access door is flush with the top surface 126. Thus, when in the closed position (FIG. 1), the at least one access door 108 covers the at least one opening 106 and protects the electrical device 102 without protruding up from the floor. When the at least one access door 108 is in the intermediate position (FIG. 3), the at least one access door is aligned with the at least one opening 106, but is outside of the at least one opening 106. When the at least one access door 108 is in the open position (FIGS. 4-5), the at least one access door 108 is misaligned with the at least one opening 106, thus providing access to the electrical device 102 through the at least one opening 106. In the embodiment shown in FIGS. 1-6, when moving from the closed position (FIG. 1) to the open position (FIG. 4-5), the at least one access door 108 cannot rotate about the hinge axis 124 without first reaching the intermediate position (FIG. 3) because the at least one opening 106 constrains the ability of the at least one access door 108 to rotate. However, other embodiments may have different openings 106 that allow rotation about and translation along the hinge axis 124 simultaneously or in a different order. In some embodiments with at least two access doors 108, one of the at least two access doors 108 may be in the open position (FIGS. 4-5) while the others of the at least two access doors 108 may be in the closed position (FIG. 1).

The surface cover 100 may also comprise at least one latch 128 configured to lock the at least one access door 108 in the closed position. One of the at least one access door 108 and the latch 128 may have a lip 130 and the other of the at least one access door 108 and the latch 128 may have an indentation 132. The lip 130 and the indentation 132 are configured to mate. Thus, when the at least one access door 108 is locked in the closed position by the at least one latch 128, the lip 130 and the indentation 132 are mated. When the lip 130 is removed from the indentation 132, the at least one access door 108 may be configured to unlock. The at least one latch 128 may unlock through a translation (compare the latch 128 in FIG. 1 with the latch 128 in FIG. 3) or through a rotation. Additionally, the surface cover 100 may comprise the electrical box 110 and the electrical device 102. The electrical box 110 is configured to surround the electrical device 102 and couple with the cover plate 104. The electrical device 102 is configured to electrically couple with and provide power to an electrical plug.

The at least one access door 108 may be biased towards specific positions. For example, in one embodiment, the at least one access door 108 is rotationally biased toward the intermediate position. Such a bias causes this embodiment to move to the intermediate position automatically unless an object interferes. For example, when an electrical cord is coupled with the electrical device 102 through the at least one opening 106 and the at least one access door 108 has such a bias, the at least one access door 108 does not move to the intermediate position because it is blocked by the electrical cord. Once the electrical cord is removed, the at least one access door 108 automatically moves to the intermediate position. As another example, the at least one access door 108 may be translationally biased towards the intermediate position. If such an embodiment also has at least one latch 128, when the at least one access door 108 is unlocked, the at least one access door may move automatically from the closed position to the intermediate position. The at least one access door 108 may also be rotationally biased toward the open position. Thus, when the at least one access door 108 reaches the intermediate position, the at least one access door 108 may automatically move from the intermediate position to the open position. Lastly, the at least one access door 108 may be translationally biased towards the closed position. In such an embodiment, once the at least one access door 108 reaches the intermediate position, the at least one access door 108 may automatically move into the closed position.

Any combination of the above biases may also be implemented. For example, in one embodiment, the at least one access door 108 is translationally biased toward the intermediate position and rotationally biased toward the open position. Such a bias causes this embodiment to move to the open position automatically from the closed position because the translational bias moves the at least one access door 108 from the closed position to the intermediate position, and the rotational bias moves the at least one access door 108 from the intermediate position to the open position. In such an embodiment, the at least one latch 128 may be used to hold the at least one access door 108 in the closed position. Alternatively, the at least one access door 108 may be rotationally biased toward the intermediate position and translationally biased toward the closed position. In such an embodiment, the at least one access door 108 moves to the closed position automatically because the rotational bias moves the at least one access door 108 from the open position to the intermediate position, and the translational bias moves the at least one access door 108 from the intermediate position to the closed position. Other combinations of biases are also possible. The translational bias may be created using a linear spring and the rotational bias may be created using a rotational spring. Other methods for providing a bias may be used as well, such as a cam and spring, or other bias element.

Implementing the subject matter of the present disclosure helps to restrict the entrance of water and other contaminants into the electrical device 102, thus reducing the likelihood of a shock hazard or fire hazard. In addition, a trip hazard is not created when the at least one access door 108 is in the intermediate or open positions due to the low profile of the at least one access door 108.

It will be understood that implementations of a horizontal surface cover are not limited to the specific assemblies, devices and components disclosed in this document, as virtually any assemblies, devices and components consistent with the intended operation of a horizontal surface cover may be used. Accordingly, for example, although particular horizontal surface covers, and other assemblies, devices and components are disclosed, such may include any shape, size, style, type, model, version, class, measurement, concentration, material, weight, quantity, and/or the like consistent with the intended operation of horizontal surface covers. Implementations are not limited to uses of any specific assemblies, devices and components; provided that the assemblies, devices and components selected are consistent with the intended operation of a horizontal surface cover.

Accordingly, the components defining any horizontal surface cover may be formed of any of many different types of materials or combinations thereof that can readily be formed into shaped objects provided that the materials selected are consistent with the intended operation of a horizontal surface cover. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various horizontal surface covers may be manufactured using conventional procedures as added to and improved upon through the procedures described here. Some components defining a horizontal surface cover may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling horizontal surface covers are not limited to the specific order of steps as disclosed in this document. Any steps or sequence of steps of the assembly of a horizontal surface cover indicated herein are given as examples of possible steps or sequence of steps and not as limitations, since various assembly processes and sequences of steps may be used to assemble horizontal surface covers.

The implementations of a horizontal surface cover described are by way of example or explanation and not by way of limitation. Rather, any description relating to the foregoing is for the exemplary purposes of this disclosure, and implementations may also be used with similar results for a variety of other applications employing a horizontal surface cover.

What is claimed is:

1. A horizontal surface cover, comprising:
   a cover plate configured to cover an electrical device within an electrical box;
   at least one opening extending through the cover plate;
   at least one access door having a hinge with a hinge axis; and
   at least one latch positioned on a face of the cover plate and configured to lock a position of the at least one access door, wherein the at least one latch is configured to move with respect to the cover plate between a locked position and an unlocked position;
   wherein the at least one access door is configured to translate along the hinge axis and rotate about the hinge axis to move between a closed position and an open position;
   wherein when the at least one access door is in the closed position, the at least one access door covers the at least one opening, and when the at least one access door is in the open position, the at least one opening is exposed; and
   wherein the at least one access door is rotationally biased toward the open position.

2. The horizontal surface cover of claim 1, the cover plate further having a top surface, wherein when the at least one access door is in the closed position, the at least one access door is flush with the top surface.

3. The horizontal surface cover of claim 1, wherein the at least one access door is configured to translate along the hinge axis between the closed position and an intermediate position and rotate about the hinge axis between the intermediate position and the open position, wherein, when the at least one access door is in the intermediate position, the at least one access door is aligned with but outside of the at least one opening.

4. The horizontal surface cover of claim 3, wherein, when in the closed position, the at least one access door is biased toward the intermediate position.

5. The horizontal surface cover of claim 1, wherein the hinge axis is perpendicular to the cover plate.

6. The horizontal surface cover of claim 1, further comprising:
   the electrical box configured to surround the electrical device and couple with the cover plate; and
   the electrical device configured to electrically couple with and provide power to an electrical plug.

7. The horizontal surface cover of claim 1, wherein one of the at least one access door and the at least one latch has a lip and the other of the at least one access door and the at least one latch has an indentation, the lip and the indentation are configured to mate, and the at least one access door is configured to unlock when the lip is removed from the indentation.

8. A horizontal surface cover, comprising:
   a cover plate configured to cover an electrical device within an electrical box;
   at least one opening extending through the cover plate;
   at least one access door having a hinge with a hinge axis, wherein the at least one access door is configured to translate along the hinge axis and rotate about the hinge axis to move between a closed position and an open position; and
   at least one latch positioned on a face of the cover plate and configured to lock the at least one access door in the closed position, wherein the at least one latch is configured to linearly move with respect to the cover plate between a locked position and an unlocked position;
   wherein when the at least one access door is in the closed position, the at least one access door covers the at least one opening, and when the at least one access door is in the open position, the at least one opening is exposed.

9. The horizontal surface cover of claim 8, the cover plate further having a top surface, wherein when the at least one access door is in the closed position, the at least one access door is flush with the top surface.

10. The horizontal surface cover of claim 8, wherein the at least one access door is configured to translate along the hinge axis between the closed position and an intermediate position and rotate about the hinge axis between the intermediate position and the open position, wherein, when the at least one access door is in the intermediate position, the at least one access door is aligned with but outside of the at least one opening.

11. The horizontal surface cover of claim 10, wherein, when in the closed position, the at least one access door is biased toward the intermediate position.

12. The horizontal surface cover of claim 8, wherein the hinge axis is perpendicular to the cover plate.

13. The horizontal surface cover of claim 8, further comprising:
    the electrical box configured to surround the electrical device and couple with the cover plate; and
    the electrical device configured to electrically couple with and provide power to an electrical plug.

14. The horizontal surface cover of claim 8, wherein one of the at least one access door and the at least one latch has a lip and the other of the at least one access door and the at least one latch has an indentation, the lip and the indentation are configured to mate, and the at least one access door is configured to unlock when the lip is removed from the indentation.

15. A horizontal surface cover, comprising:
   a cover plate configured to cover an electrical device within an electrical box;
   at least one opening extending through the cover plate; and
   at least one access door having a hinge with a hinge axis, wherein the at least one access door is configured to translate along the hinge axis and rotate about the hinge axis to move between a closed position and an open position;
   wherein when the at least one access door is in the closed position, the at least one access door covers the at least one opening, and when the at least one access door is in the open position, the at least one opening is exposed; and
   wherein the at least one access door is rotationally biased toward the open position.

16. The horizontal surface cover of claim 15, the cover plate further having a top surface, wherein when the at least one access door is in the closed position, the at least one access door is flush with the top surface.

17. The horizontal surface cover of claim 15, wherein the at least one access door is configured to translate along the hinge axis between the closed position and an intermediate position and rotate about the hinge axis between the intermediate position and the open position, wherein, when the at least one access door is in the intermediate position, the at least one access door is aligned with but outside of the at least one opening.

18. The horizontal surface cover of claim 17, wherein, when in the closed position, the at least one access door is biased toward the intermediate position.

19. The horizontal surface cover of claim 15, the cover plate comprising at least one latch, wherein one of the at least one access door and the at least one latch has a lip and the other of the at least one access door and the at least one latch has an indentation, the lip and the indentation are configured to mate, and the at least one access door is configured to unlock when the lip is removed from the indentation.

20. The horizontal surface cover of claim 15, further comprising at least one latch positioned on a face of the cover plate and configured to lock the at least one access door in the closed position, wherein the at least one latch is configured to linearly move with respect to the cover plate between a locked position and an unlocked position.

* * * * *